United States Patent
Omi

(10) Patent No.: US 6,974,284 B2
(45) Date of Patent: Dec. 13, 2005

(54) CUTTER DRIVING APPARATUS IN BORING MACHINE

(75) Inventor: Shohei Omi, Anjo (JP)

(73) Assignee: OMI Kogyo Co., Ltd., Aichi-Ken (JP)

( * ) Notice: Subject to any disclaimer, the term of this patent is extended or adjusted under 35 U.S.C. 154(b) by 0 days.

(21) Appl. No.: 10/655,055

(22) Filed: Sep. 4, 2003

(65) Prior Publication Data

US 2004/0047698 A1 Mar. 11, 2004

(30) Foreign Application Priority Data

Sep. 5, 2002 (JP) ............................ 2002-259840

(51) Int. Cl.[7] .............................................. B23Q 5/22
(52) U.S. Cl. ........................... 408/141; 408/76; 408/95
(58) Field of Search ........................... 408/76, 95, 97, 408/110, 111, 135, 136

(56) References Cited

U.S. PATENT DOCUMENTS

| | | | | |
|---|---|---|---|---|
| 1,395,194 A | * | 10/1921 | Lindhe | 408/92 |
| 2,151,205 A | * | 3/1939 | Hawn | 408/56 |
| 2,997,900 A | * | 8/1961 | Pugsley | 408/95 |
| 3,186,261 A | * | 6/1965 | Howard et al. | 408/111 |
| 4,358,228 A | | 11/1982 | Stark | |
| 4,585,376 A | * | 4/1986 | Davenport, Sr. et al. | 408/110 |
| 5,277,526 A | * | 1/1994 | Corsi | 408/97 |
| 5,299,894 A | * | 4/1994 | McCowin | 408/1 R |
| 5,797,708 A | * | 8/1998 | Bencic | 408/112 |
| 5,954,460 A | * | 9/1999 | Degen et al. | 408/112 |
| 6,280,123 B1 | | 8/2001 | Gill | |
| 6,309,145 B1 | * | 10/2001 | Tremblay et al. | 408/1 R |
| 6,514,018 B2 | * | 2/2003 | Martinez et al. | 408/14 |

FOREIGN PATENT DOCUMENTS

| | | |
|---|---|---|
| DE | 125 447 C | 2/1900 |
| EP | 0 516 343 A | 12/1992 |
| EP | 160 058 AC | 12/2001 |

OTHER PUBLICATIONS

European Search Report of application EP 03 01 9848 dated Jan. 29, 2004.

* cited by examiner

Primary Examiner—Derris H. Banks
Assistant Examiner—J Williams
(74) Attorney, Agent, or Firm—TraskBritt

(57) ABSTRACT

A cutter driving apparatus has a spindle, a base, and a transmission shaft. The spindle has a cutter attached thereto. The base moves along the axis of the spindle. The spindle moves integrally with the base along the axis of the spindle. The base has a pair of support rods. The support rods are disposed apart from the spindle. The transmission shaft transmits a power to the base through the support rods so as to move the base along the axis of the spindle. This structure provides the cutter driving apparatus that facilitates boring operations by boring machines.

11 Claims, 7 Drawing Sheets

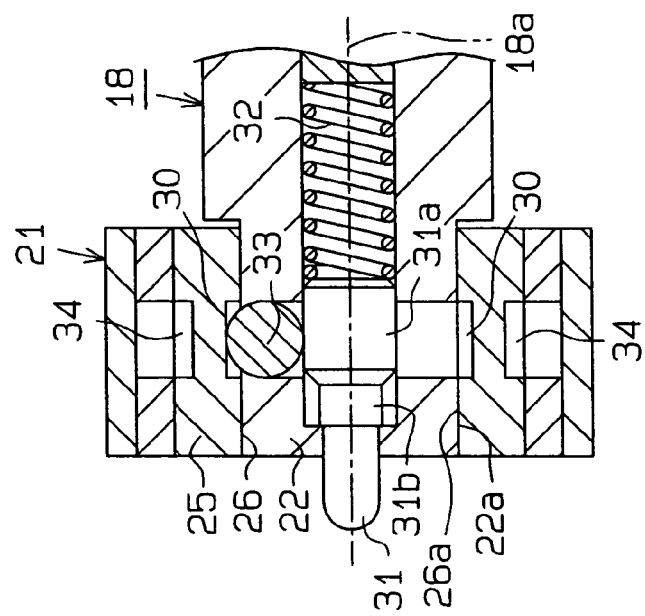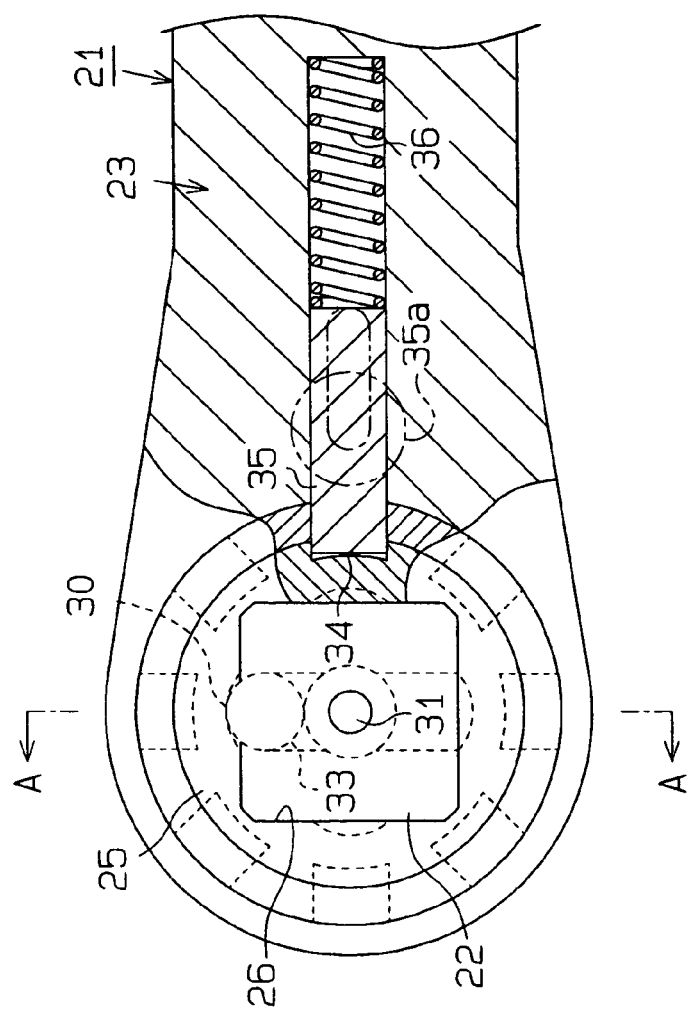

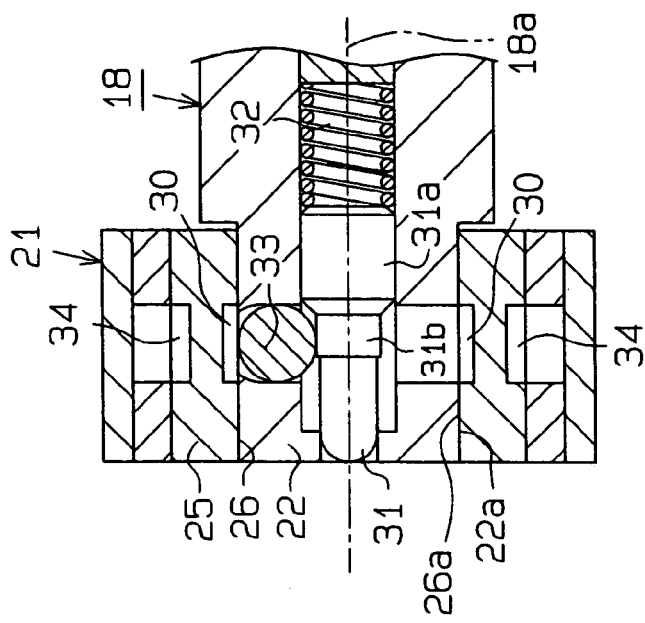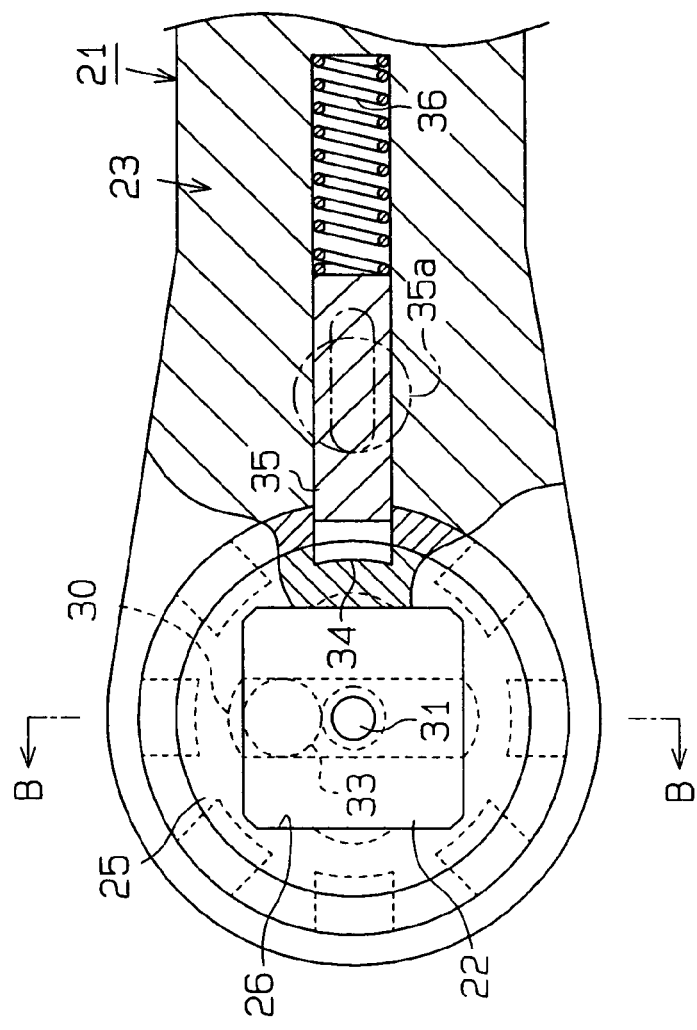

US 6,974,284 B2

CUTTER DRIVING APPARATUS IN BORING MACHINE

BACKGROUND OF THE INVENTION

The present invention relates to a cutter driving apparatus to be incorporated into a boring machine.

A boring machine provided with a cutter driving apparatus shown in FIGS. 7(a) and 7(b) is disclosed in the specification of U.S. Pat. No. 6,280,123. In this cutter driving apparatus, a cutter 114 is attached to a spindle 112, which rotates integrally with a drive shaft 106 disposed in a housing 105.

Since the drive shaft 106 and the spindle 112 are connected to each other with a spline 113, the spindle 112 can move relative to the drive shaft 106 along the axis 106a thereof. A quill 115 rotatably surrounds the spindle 112 and is movable integrally with the spindle 112 along the axis 106a. A pinion 118 is meshed with a rack 119 provided on the quill 115 and is rotated by operating an operation handle (not shown). Thus, when the pinion 118 rotates, both the quill 115 and the spindle 112 move along the axis 106a.

When the spindle 112 moves along the axis 106a, the distance over which a cutter 114 attached to the spindle 112 moves, the stroke S shown in FIG. 7(a), depends upon the length of the rack 119. However, the length of the rack 119 is subject to the design limitation so as to avoid interference of the rack 119 with members located around the drive shaft 106 and spindle 112. Thus, the stroke S is not very long. Therefore, the conventional boring machine is unable to form deep bores.

SUMMARY OF THE INVENTION

Accordingly, the object of the present invention is to provide a cutter driving apparatus that facilitates boring operations by boring machines.

To achieve the foregoing and other objectives and in accordance with the purpose of the present invention, a cutter driving apparatus is provided to be incorporated into a boring machine. The cutter driving apparatus includes a spindle rotating around its own axis, a moving member moving along the axis of the spindle, and a transmission member transmitting a power to the moving member so as to move the moving member along the axis of the spindle. The spindle has a cutter attached thereto. The spindle moves integrally with the moving member along the axis of the spindle. The moving member has a peripheral part disposed apart from the spindle. The transmission member transmits the power to the moving member through the peripheral part.

The present invention provides another cutter driving apparatus, which includes a spindle, a moving member, an operation member, a transmission member, and a joint. The spindle rotates around its own axis. The spindle has a cutter attached thereto. The moving member moves along the axis of the spindle. The spindle moves integrally with the moving member along the axis of the spindle. The operation member is operated so as to move the moving member along the axis of the spindle. The transmission member is located between the operation member and the moving member. The operation member is removably connected to the transmission member. The joint connects the operation member with the transmission member. The joint is shifted selectively between an admissible state where the joint admits transmission of a power from the operation member to the transmission member and an inadmissible state where the joint does not admit transmission of a power from the operation member to the transmission member. The power transmitted to the transmission member is transmitted to the moving member to move the moving member along the axis of the spindle.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5(a) is a partly cut-away side view showing a handle provided in the cutter driving apparatus shown in FIG. 3, assuming the locked state;

FIG. 5(b) is a cross-sectional view taken along the line A—A in FIG. 5(a);

FIG. 6(a) is a partly cut-away side view of the handle shown in FIG. 5(a), assuming the unlocked state;

FIG. 6(b) is a cross-sectional view taken along the line B—B in FIG. 6(a); and

DETAILED DESCRIPTION OF THE PREFERRED EMBODIMENTS

One embodiment of the present invention will be described referring to FIG. 1 to FIG. 6(b).

Figure 1:
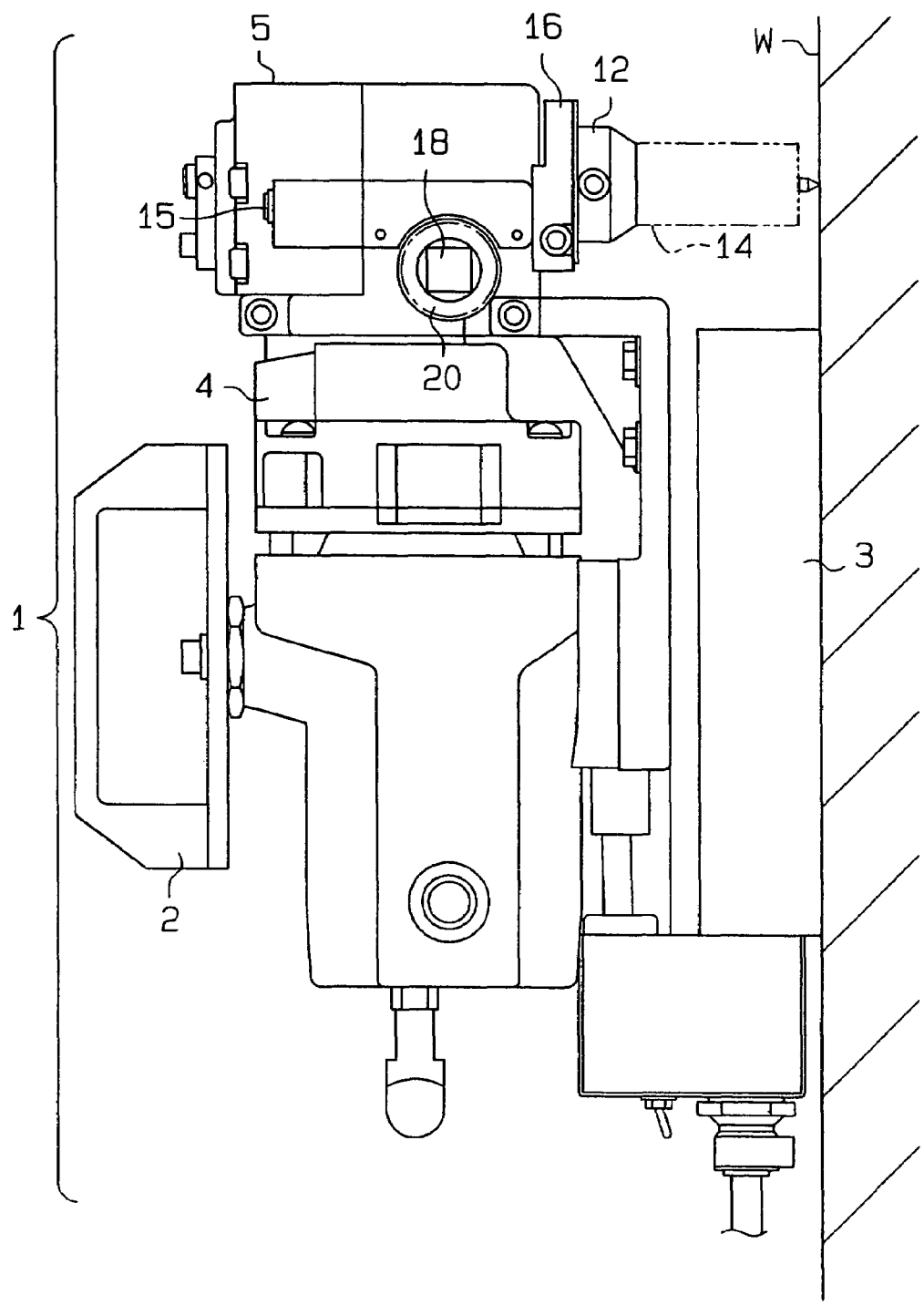
FIG. 1 is a side view showing a boring machine according to one embodiment of the present invention.
Figure 2:
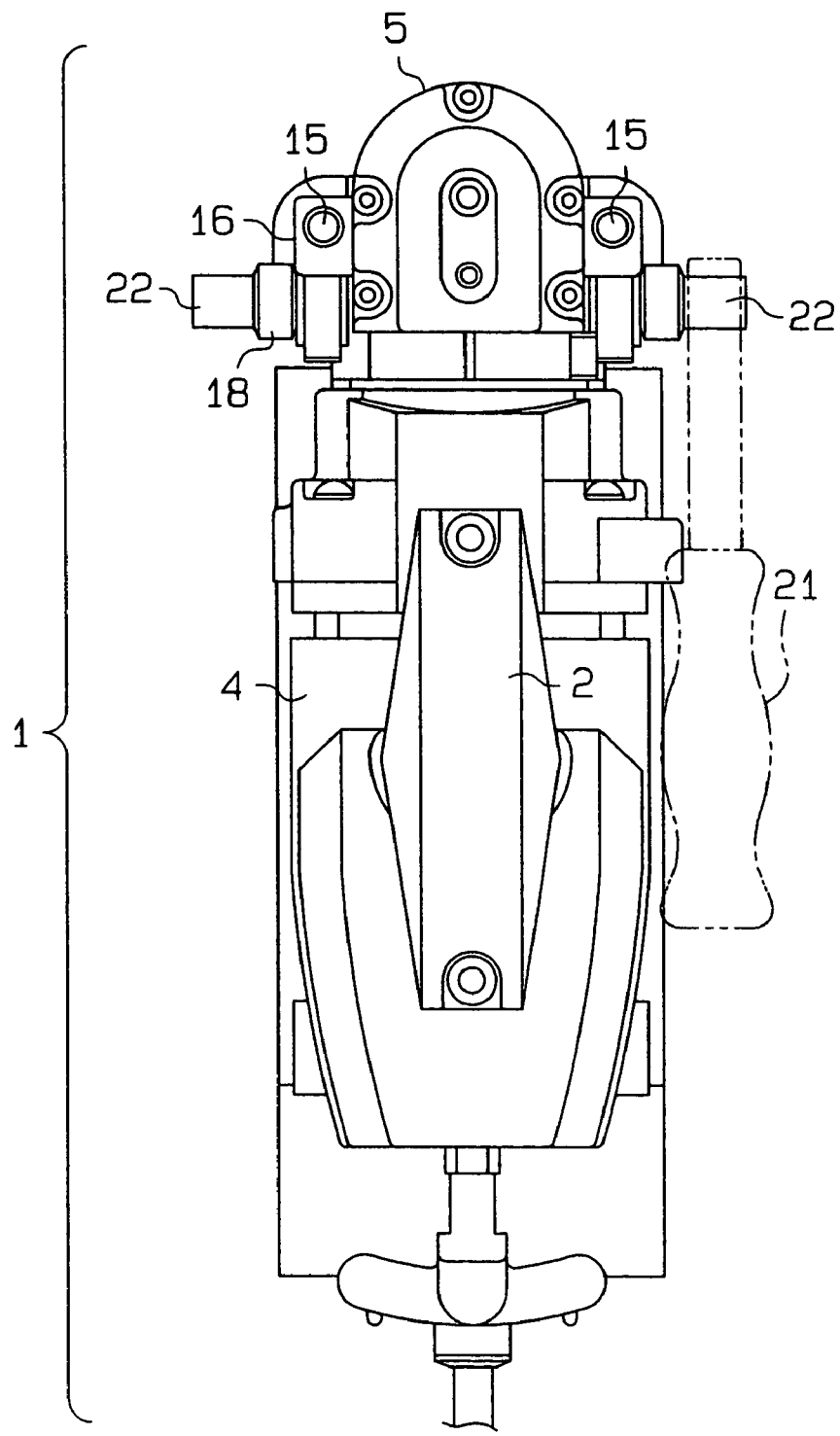
FIG. 2 is a plan view of the boring machine shown in FIG. 1.

As shown in FIG. 1 and FIG. 2, the boring machine 1 according to this embodiment is provided with a grip 2 facilitating portage of the boring machine 1 and a magnet 3 facilitating mounting of the boring machine 1 onto a workpiece W. The boring machine 1 is also provided with an electric motor 4 and a cutter driving apparatus to be disposed inside and outside of a housing 5 attached to the external side of the electric motor 4.

The cutter driving apparatus will be described below in detail.

Figure 3:
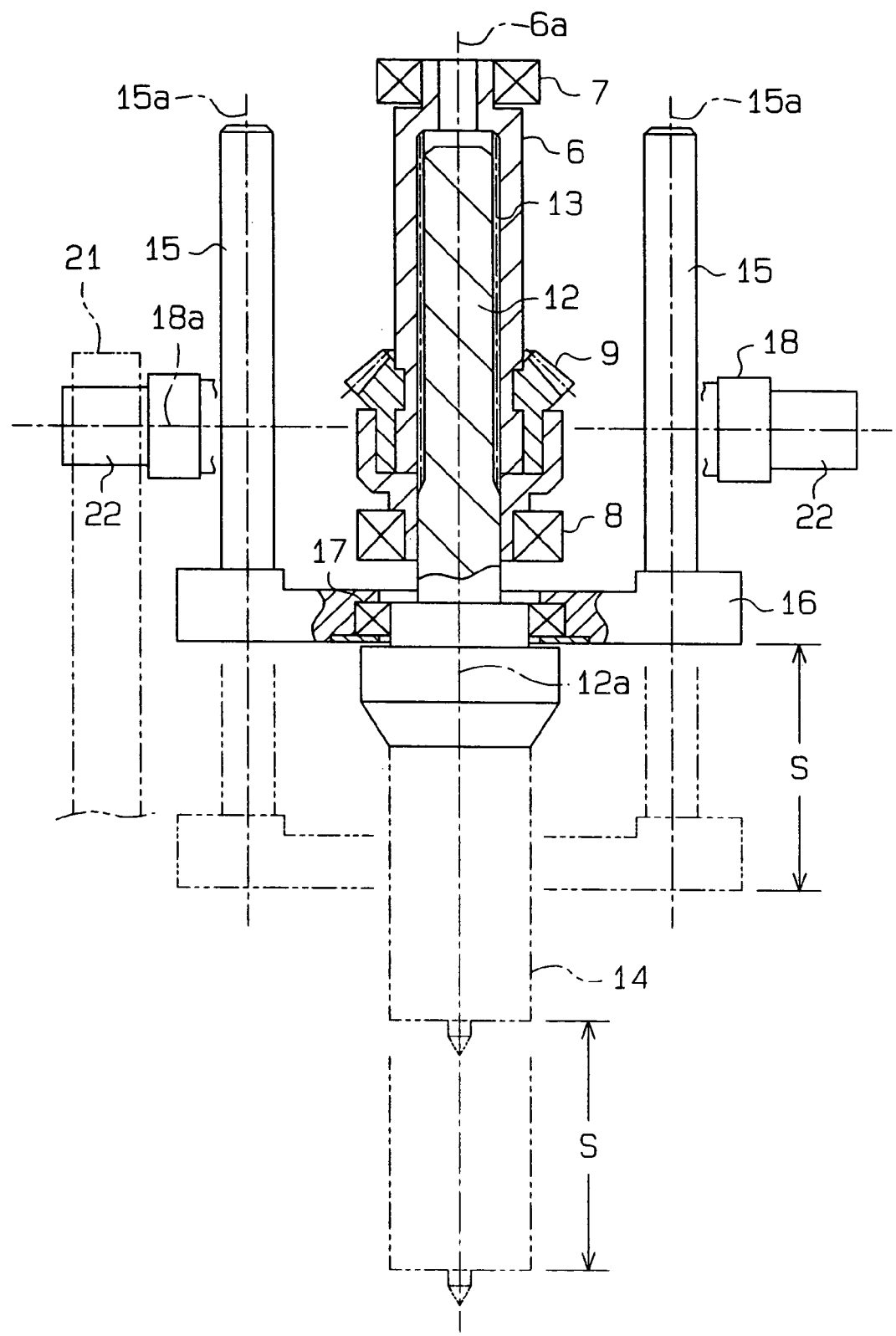
FIG. 3 is a partly cut-away front view of the cutter driving apparatus to be incorporated into the boring machine of FIG. 1.
Figure 4A:
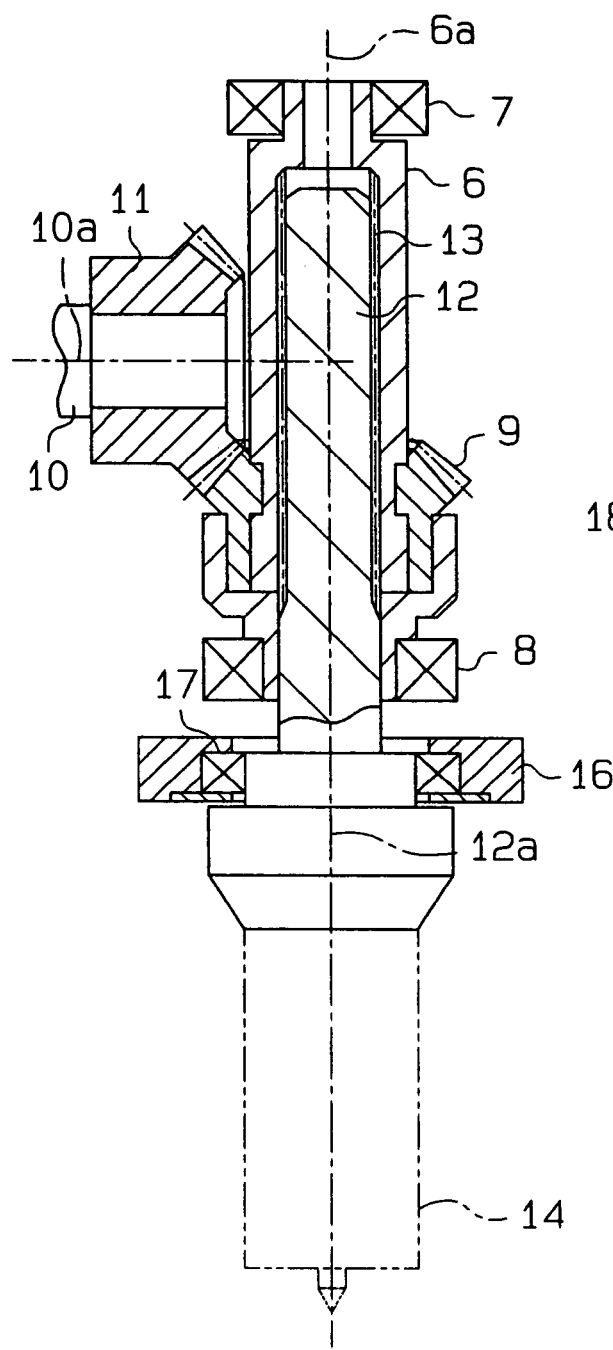
FIG. 4(a) is a partly cut-away side view of the cutter driving apparatus shown in FIG. 3.

A drive shaft 6 shown in FIG. 3 and FIG. 4(a) is disposed inside the housing 5. The drive shaft 6 is supported by bearings 7, 8 to be rotatable around the axis 6a thereof. The drive shaft 6 is provided with a bevel gear 9, which rotates integrally with the drive shaft 6 around the axis 6a. As shown in FIG. 4(a), the bevel gear 9 meshes with a bevel gear 11 of the electric motor 4. The bevel gear 11 is attached to an output shaft 10 of the electric motor 4 and rotates integrally with the output shaft 10 around the axis 10a thereof. Thus, the rotation of the output shaft 10 around its axis 10a causes the drive shaft 6 to rotate around its axis 6a.

The axis 6a of the drive shaft 6 intersects orthogonally with the axis 10a of the output shaft 10.

A spindle 12 shown in FIG. 3 and FIG. 4(a) is supported to be rotatable around the axis 12a thereof by a bearing 17 contained in a base 16 disposed on the external side of the housing 5. The axis 12a of the spindle 12 is in alignment with the axis 6a of the drive shaft 6.

Figure 4B:
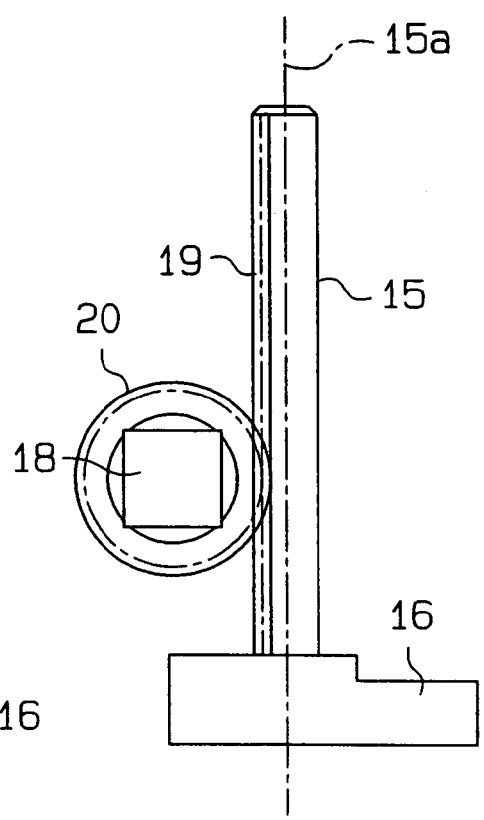
FIG. 4(b) is a side view showing a part of the cutter driving apparatus shown in FIG. 3.

As shown in FIG. 3 and FIG. 4(b), the base 16 has a pair of support rods 15 as peripheral parts. The axis 15a of each support rod 15 is parallel to the axis 12a of the spindle 12. As shown in FIG. 3, the spindle 12 is located between these two support rods 15. A predetermined clearance is secured between the spindle 12 and each support rod 15. In other words, each support rod 15 is located apart from the drive shaft 6 and from the spindle 12. As shown in FIG. 4(b), each support rod 15 is provided with a rack 19 extending along the axis 15a thereof.

A transmission shaft 18 shown in FIG. 3 and FIG. 4(b) is rotated around the axis 18a thereof by operating a handle 21 (see FIG. 2 and FIG. 3). The axis 18a of the transmission shaft 18 intersects orthogonally with the axis 10a of the output shaft 10 and with the axis 6a of the drive shaft 6. As shown in FIG. 4(b), the transmission shaft 18 is provided with a pair of pinions 20, which rotate integrally with the transmission shaft 18 around the axis 18a thereof. The pair of pinions 20 is meshed with the racks 19 respectively. Thus, rotation of the transmission shaft 18 around the axis 18a thereof causes the support rods 15 and the base 16 to move along the axis 12a of the spindle 12. More specifically, the support rods 15 and the base 16 function as moving member that move along the axis 12a of the spindle 12. Both end portions 22 of the transmission shaft 18 are located outside the housing 5.

As shown in FIG. 3 and FIG. 4(a), the spindle 12 is connected to the drive shaft 6 with a spline 13. Thus, the spindle 12 can move along its axis 12a relative to the drive shaft 6 and also rotates integrally with the drive shaft 6. Therefore, movement of the base 16 along the axis 12a of the spindle 12 causes the spindle 12 to move along its axis 12a, and rotation of the drive shaft 6 around its axis 6a causes the spindle 12 to rotate around its axis 12a.

A cutter 14 can be removably attached to the distal end of the spindle 12. The cutter 14 attached to the spindle 12 is located outside the housing 5 to rotate and move integrally with the spindle 12.

Therefore, a torque output from the electric motor 4 through the output shaft 10 is transmitted through the drive shaft 6 to the spindle 12. Then, the cutter 14 attached to the spindle 12 rotates integrally with the spindle 12 around the axis 12a, depending on the torque.

Figure 7A:
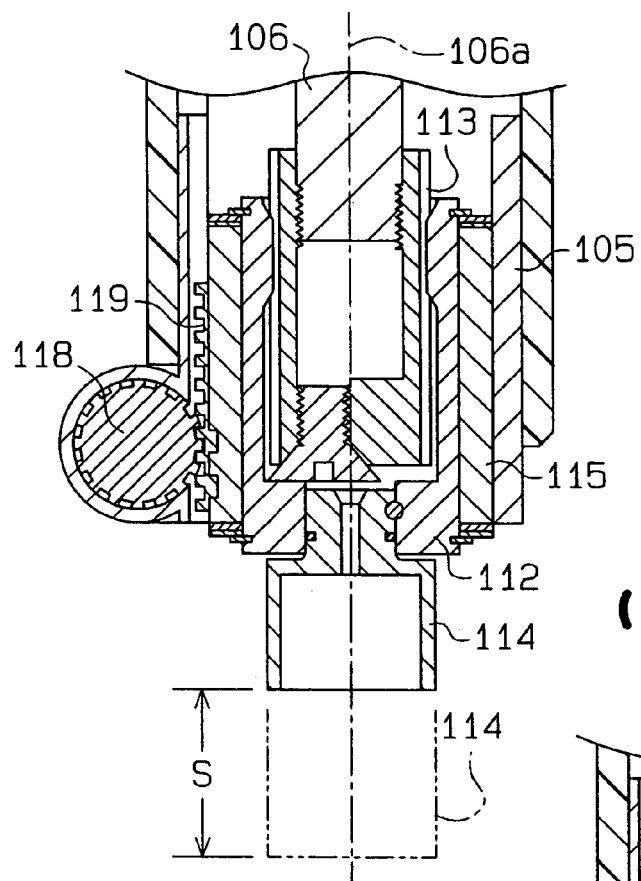
FIG. 7(a) and FIG. 7(b) are cross-sectional views each showing a part of the cutter driving apparatus incorporated into the boring machine of the prior art.
Figure 7B:
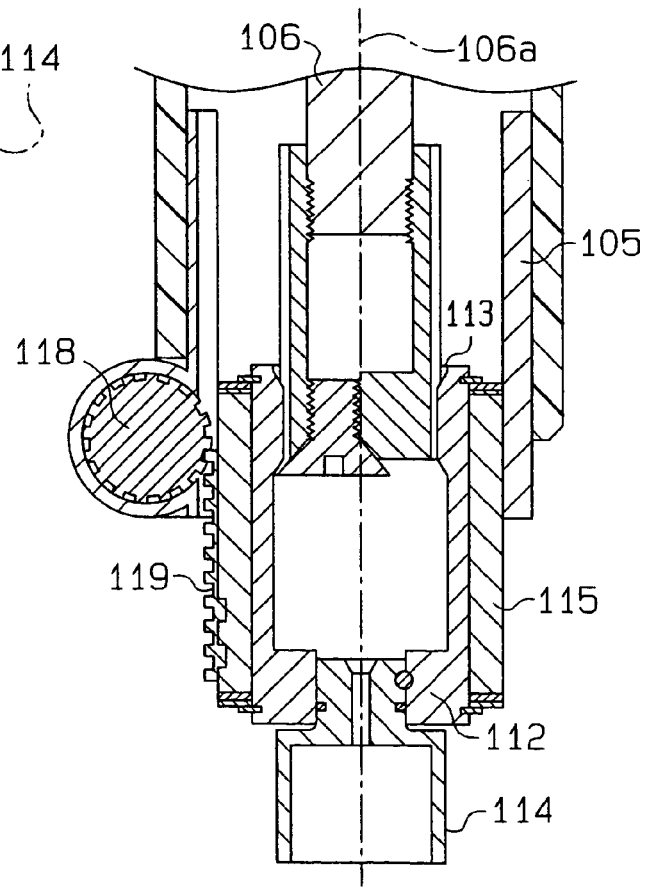

When the spindle 12 moves along its axis 12a, the distance over which the cutter 14 attached to the spindle 12 moves, the stroke S shown in FIG. 3, is greater than that in the conventional cutter driving apparatus shown in FIG. 7(a). This is because the rack 19 shown in FIG. 4(b) is longer than the conventional rack 119 shown in FIG. 7(a). Since the rack 19 is provided on each support rod 15 located apart from the drive shaft 6 and apart from the spindle 12, it does not interfere with members disposed around the drive shaft 6 and spindle 12.

As shown in FIG. 5(a) to FIG. 6(b), both end portions 22 of the transmission shaft 18 have a substantially square cross section. In other words, each end portion 22 has four plane surfaces 22a arranged around the axis 18a at 90° intervals. Each end portion 22 has a pin 31, a helical compression spring 32, and a movable part. In this embodiment, the movable part is a ball 33. The pin 31 has a large-diameter portion 31a formed on the proximal end side thereof and a small-diameter portion 31b formed at an intermediate part in the axial direction thereof. The pin 31 moves between a protrusion position (see FIG. 5(b)) and a retraction position (see FIG. 6(b)). At the protrusion position, the tip of the pin 31 protrudes from the end face of the transmission shaft 18, while the tip of the pin 31 at the retraction position does not protrude from the end face of the transmission shaft 18. When the pin 31 is located at the protrusion position, the large-diameter portion 31a is abutted against the ball 33 to urge the ball 33 such that a part of it protrudes from the plane surface 22a. Meanwhile, when the pin 31 is located at the retraction position, the small-diameter portion 31b is abutted against the ball 33, so that the ball 33 does not protrude from the plane surface 22a. The helical compression spring 32 urges the pin 31 located at the retraction position toward the protrusion position.

The handle 21 has a main body 23 and a joint 25 attached to one end portion thereof. The joint 25 contains a center hole 26, and the axis of the center hole 26 intersects orthogonally with the major axis of the main body 23. The joint 25 is rotatable around the axis of the center hole 26 relative to the main body 23. The center hole 26 has a substantially square shape. In other words, the center hole 26 is defined by planes containing four plane surfaces 26a arranged around the axis thereof at 90° intervals. Each plane surface 26a has a recess 30 defined thereon. The center hole 26 permits insertion of the end portion 22 of the transmission shaft 18. The end portion 22 inserted to the center hole 26 enables the transmission shaft 18 to rotate integrally with the joint 25.

If the pin 31 is located at the protrusion position when the end portion 22 of the transmission shaft 18 is inserted to the center hole 26, a part of the ball 33 protruding from the plane surface 22a is brought into the recess 30. Thus, the transmission shaft 18 becomes unable to disengage from the joint 25. Meanwhile, when the pin 31 is located at the retraction position, the part of the ball 33 protruding from the plane surface 22a retracts from the recess 30. Thus, the transmission shaft 18 becomes disengageable from the joint 25.

A plurality of recesses 34 is formed on the peripheral surface of the joint 25. The main body 23 is provided with a movable part in the vicinity of the joint 25. In this embodiment, the movable part is a pin 35. The pin 35 moves between a protrusion position (see FIG. 5(a)) and a retraction position (see FIG. 6(a)). At the protrusion position, the tip of the pin 35 is located in one of the recesses 34, while the tip of the pin 35 at the retraction position is located in none of the recesses 34. When the pin 35 is located at the protrusion position, the joint 25 can rotate around the axis of the center hole 26 integrally with the main body 23. Meanwhile, when the pin 35 is located at the retraction position, the rotation of the main body 23 is not transmitted to the joint 25. More specifically, the main body 23 runs idle relative to the joint 25. A helical compression spring 36 urges the pin 35 located at the retraction position toward the protrusion position. A knob 35a moves between a locking position and an unlocking position. When the knob 35a is located at the locking position, the pin 35 is brought to the protrusion position, whereas when the knob 35a is located at the unlocking position, the pin 35 is brought to the retraction position.

When the cutter 14 attached to the spindle 12 is to be moved along the axis 12a of the spindle 12, the handle 21 is fitted to one end portion 22 of the transmission shaft 18. Then, after the knob 35a is brought to the locking position, the handle 21 is rotated around the axis of the center hole 26.

Thus, the transmission shaft 18 rotates integrally with the handle 21 to cause the cutter 14 to move along the axis 12a of the spindle 12.

In the case where rotation of the handle 21 in a desired direction is interfered by an obstacle, the knob 35a is brought to the unlocking position, and the handle 21 is rotated in the direction opposite to the desired direction. The knob 35a is then returned to the locking position, and the handle 21 is rotated in the desired direction. Thus, the cutter 14 moves in one direction by reciprocating the handle 21 without detaching the handle 21 from the transmission shaft 18.

When the handle 21 is detached from the transmission shaft 18, the pin 31 is brought to the retraction position from the protrusion position resisting against the urging force of the helical compression spring 32. Thus, the handle 21 can be disengaged from the transmission shaft 18.

The present examples and embodiments are to be considered as illustrative and not restrictive and the invention is not to be limited to the details given herein, but may be modified within the scope and equivalence of the appended claims.

What is claimed is:

1. A cutter driving apparatus to be incorporated into a boring machine, the cutter driving apparatus comprising:
    a spindle rotating around its own axis, wherein the spindle has a cutter attached thereto;
    a moving member moving along the axis of the spindle, wherein the spindle moves integrally with the moving member along the axis of the spindle, and wherein the moving member has an peripheral part disposed apart from the spindle;
    a transmission member transmitting a power to the moving member so as to move the moving member along the axis of the spindle, wherein the transmission member transmits the power to the moving member through the peripheral part; and
    an operation member, attached to the transmission member, wherein the operation member is operated so as to move the moving member through the transmission member,
    wherein the operation member is removably attached to the transmission member,
    wherein one of the transmission member and the operation member is a first member, and the other one of the transmission member and the operation member is a second member, wherein the first member includes a movable part, wherein, where the operation member is attached to the transmission member, the movable part moves between an engaging position where it is engaged with the second member and a non-engaging position wherein it is not engaged with the second member, wherein, when the movable part is located at the engaging position, the operation member is not disengageable from the transmission member, and therein, when the movable part is located at the non-engaging position, the operation member is disengageable from the transmission member.

2. The cutter driving apparatus according to claim 1 further comprising a drive shaft rotating around its own axis, wherein the spindle is designed to able to rotate integrally with the drive shaft, and wherein the axis of the spindle is in alignment with the axis of the drive shaft.

3. The cutter driving apparatus according to claim 1 wherein the spindle is rotatable relative to the moving member.

4. The cutter driving apparatus according to claim 1, wherein the peripheral part is a support rod extending parallel to the axis of the spindle.

5. The cutter driving apparatus according to claim 4, wherein the support rod is a pair of support rods, and the spindle is located between the pair of support rods.

6. The cutter driving apparatus according to claim 1 wherein the transmission member has a first and second end portion an end portion on each side of the transmission member, and the operation member is attached to one of the end portions.

7. A cutter driving apparatus to be incorporated into a boring machine, the cutter driving apparatus comprising:
    a spindle rotating around its own axis, wherein the spindle has a cutter attached thereto;
    a moving member moving along the axis of the spindle, wherein the spindle moves integrally with the moving member along the axis of the spindle, and wherein the moving member has a peripheral part disposed apart from the spindle;
    a transmission member transmitting a power to the moving member so as to move the moving member along the axis of the spindle, wherein the transmission member transmits the power to the moving member through the peripheral part; and
    an operation member, attached to the transmission member, wherein the operation member is operated so as to move the moving member through the transmission member; and
    a joint connecting the operation member with the transmission member, wherein the joint is selectively shifted between an admissible state where the joint admits transmission of a power from the operation member to the transmission member and an inadmissible state where the joint does not admit transmission of a power from the operation member to the transmission member.

8. The cutter driving apparatus according to claim 7, wherein the operation member has the joint and a remainder portion, wherein one of the joint and the reminder portion is a first portion, and the other one of the joint and the reminder portion is a second portion, wherein the first portion includes a movable part, wherein the movable part moves between an engaging position where it is engaged with the second portion and a non-engaging position wherein is it not engaged with the second portion, wherein, when the movable part is located at the engaging position, the joint is in the admissible state, and wherein, when the movable part is located at the non-engaging position, the joint is in the inadmissible state.

9. A cutter driving apparatus to be incorporated into a boring machine, the cutter driving apparatus comprising:
    a spindle rotating around its own axis, wherein the spindle has a cutter attached thereto;
    a moving member moving along the axis of the spindle, wherein the spindle moves integrally with the moving member along the axis of the spindle;
    an operation member to be operated so as to move the moving member along the axis of the spindle;
    a transmission member located between the operation member and the moving member, wherein the operation member is removable connected to the transmission member; and
    a joint connecting the operation member with the transmission member, wherein the joint is shifted selectively between an admissible state where the joint is shifted selectively between an admissible state where the joint admits transmission of a power from the operation member to the transmission member and an inadmissible state where the joint does not admit transmission of a power from the operation member to the transmission member, and wherein the power transmitted to the transmission member is transmitted to the moving member to move the moving member along the axis of the spindle.

10. The cutter driving apparatus according to claim 9, wherein one of the transmission member and the operation member is a first member, and the other one of the transmission member and the operation member is a second member, wherein the first member includes a movable part, wherein, when the operation member is attached to the transmission member, the movable part moves between an engaging position where it is engaged with the second member and a non-engaging position where it is not engaged with the second member, wherein, when the movable part is located at the engaging position, the operation member is not disengageable from the transmission member, and wherein, when the movable part is located at the non-engaging position, the operation member is disengageable from the transmission member.

11. The cutter driving apparatus according to claim 9, wherein the operation member has the joint and a remainder portion, wherein one of the joint and the remainder portion is a first portion, and the other one of the joint and the remainder portion is a second portion, wherein the first portion includes a movable part, wherein the movable part moves between an engaging position where it is engaged with the second portion and a non-engaging position where it is not engaged with the second portion, wherein when the movable part is located at the engaging position, the joint is in the admissible state, and wherein, when the movable part is located at the non-engaging position, the joint is in the inadmissible state.

* * * * *